Figure 1:
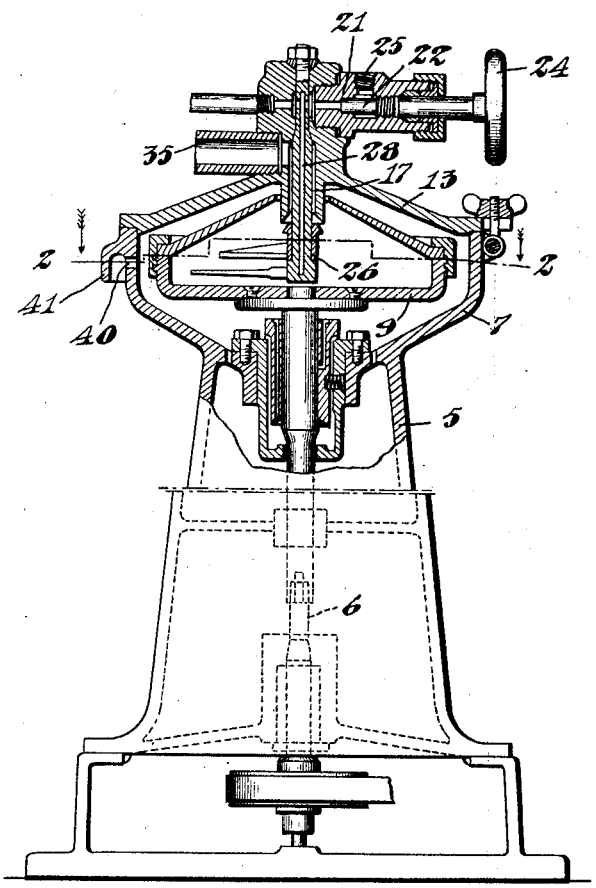

J. M. COLONY.
EMULSIFIER.
APPLICATION FILED JAN. 9, 1922.

1,434,095. Patented Oct. 31, 1922.

INVENTOR
John M Colony
By his attorney
J H McCready

Patented Oct. 31, 1922.

1,434,095

UNITED STATES PATENT OFFICE.

JOHN M. COLONY, OF NEWTON, MASSACHUSETTS, ASSIGNOR TO MANTON-GAULIN MANUFACTURING COMPANY, OF SOUTH BOSTON, MASSACHUSETTS, A CORPORATION OF MAINE.

EMULSIFIER.

Application filed January 9, 1922. Serial No. 527,845.

*To all whom it may concern:*

Be it known that I, JOHN M. COLONY, a citizen of the United States, residing at Newton, in the county of Middlesex and State of Massachusetts, have invented certain new and useful Improvements in Emulsifiers, of which the following is a specification.

This invention relates to emulsifiers of the type in which a revolving bowl or container is used.

Much difficulty has been experienced heretofore in using emulsifiers of this type due to the introduction of air into the material being emulsified. Such emulsifiers are much used in the making of so-called "reconstructed" milk, cream and the like. If the milk produced in this manner is run directly into cans and these cans are immediately shipped, it is found when the cans are opened a day or two later that there has been a very substantial shrinkage in the apparent volume of milk due to escape of the air which originally was contained in the milk. This, of course, is very unsatisfactory both to the shipper and also to the customer, and it has therefore been the practice to allow the milk to set for at least a day before shipping it in order to allow the air to escape. This practice obviously adds to the cost of production of the milk, and it causes bother and annoyance.

I have found that this entire difficulty can be avoided by properly venting the space in which the bowl revolves.

The nature of the solution for the problem above described will readily be understood from the following description when read in connection with the accompanying drawings, and the novel features will be particularly pointed out in the appended claims.

Figure 2:
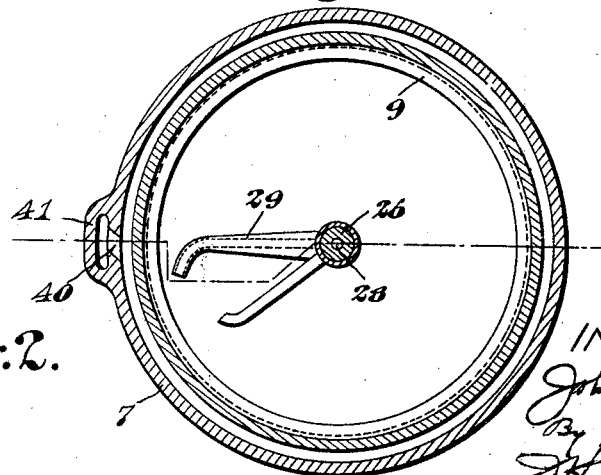

Referring now to the drawings,

Figure 1 is a view partly in side elevation and partly in vertical cross section of an emulsifier constructed in accordance with this invention; and Fig. 2 is a cross sectional view on the line 2—2, Fig. 1.

The emulsifier shown is substantially like that shown and described in the Williams Patent No. 1,200,559 granted October 10, 1916 to which reference should be made for a complete description of this machine. For the purposes of the present invention it is sufficient to state that the machine includes a container 9, herein referred to as a "bowl", to which the product to be emulsified flows and in which it is rapidly revolved. This bowl is supported on the upper end of a shaft 6 mounted in suitable bearings in the machine frame 5, and it is enclosed in a casing 7. The liquid to be emulsified is conducted to the machine through a supply pipe 35 and thence flows through a duct or passage 17 into the bowl 9. This bowl is usually rotated at about 9000 revolutions per minute, and the liquid mixture delivered thereto is thrown outwardly by centrifugal inertia against the inner wall of the bowl where it forms a rapidly revolving layer. The momentum of this liquid is utilized to force it through a discharge pipe 29 and thence through a pipe 28 to the discharge outlet 25, passing on its way to this outlet between a squeezing plug 22 and a seat 21 for said plug, the plug being adjustable by means of the hand wheel 24. The milk or other liquid being treated is forced between the surfaces of the parts 21 and 22 under high pressure, and after passing between these surfaces the pressure of the liquid is converted into velocity and the fat globules contained therein are disrupted or so broken up that the milk mixture becomes very homogeneous in its composition. The reference numerals above referred to are those used to designate corresponding parts in the patent above identified.

As above stated, the milk, or other emulsified product, when discharged from the machine, as formerly constructed, contains an excessive amount of air. I have found, however, that the introduction of an undesirable amount of air into the product is completely avoided by making a hole or vent, such, for instance, as that shown at 40, in the casing 7. I believe that the advantageous result which is produced by this arrangement is due to the fact that it relieves the excessive air pressure which otherwise would be created in the immediate vicinity of the bowl, or in other words, prevents the creation of an excessive air pressure in this region. It will readily be appreciated that a bowl of this character rotating at about 9000 revolutions per minute will act more or less as a fan, and that this will tend to create considerable air pressure particularly around the periphery of the bowl, and apparently this pressure, unless relieved, is transmitted to the interior of the bowl and consequently results in the introduction of an undesirable amount of air into the milk or other product being treated. But regardless of what may be the reason for the desirable results produced by this construction, the important point is that the venting of the space in which the bowl 9 revolves does effectually prevent the introduction of air into the material being treated, and therefore avoids the difficulty that has been experienced heretofore in using machines of this type.

For the purpose of preventing the accidental entrance of foreign materials into the casing through the vent 40, I prefer to protect this vent by means of an overhanging shield 41. The casing 7 usually is cast so that the vent 40 can be made by cording in the well known manner, and the shield 41 can be cast integral with the casing.

While I have shown the vent 40 located at a point opposite the maximum diameter of the bowl 9, it will be appreciated that the vent can be located at other points in the casing, and that several such vents can be used around the casing if desired.

Having thus described my invention, what I desire to claim as new is:

1. An emulsifier comprising, in combination, a bowl mounted for rapid rotation, and a casing enclosing said bowl and having a vent therein for the relief of air pressure in the immediate vicinity of the bowl.

2. An emulsifier comprising, in combination, a bowl mounted for rapid rotation, a casing enclosing said bowl and having a vent therein adjacent to the periphery of said bowl for the relief of air pressure created in the vicinity of the bowl during the operation of the emulsifier.

3. An emulsifier comprising, in combination, a bowl mounted for rapid rotation, a casing enclosing said bowl and having a hole therein substantially opposite the region of maximum diameter of the bowl to prevent the creation of any substantial air pressure in said casing during the normal operation of the apparatus.

4. An emulsifier comprising, in combination, a bowl mounted for rapid rotation, a casing enclosing said bowl and having a vent therein for the relief of air pressure in the immediate vicinity of the bowl, and a shield covering the outer end of said vent.

5. An emulsifier comprising, in combination, a bowl mounted for rapid rotation, a casing enclosing said bowl and having a vent therein for the relief of air pressure in the immediate vicinity of the bowl, and an overhanging shield covering the outer end of said vent.

6. An emulsifier comprising, in combination, a bowl mounted for rapid rotation, a casing enclosing said bowl, said casing having a vent located therein at a point which prevents the creation of excessive air pressure in the immediate vicinity of the bowl during the normal operation of the apparatus.

JOHN M. COLONY.